(12) United States Patent
Kiriakos et al.

(10) Patent No.: US 11,572,194 B2
(45) Date of Patent: Feb. 7, 2023

(54) AIRCRAFT DOOR LATCH ASSEMBLY

(71) Applicant: The Boeing Company, Chicago, IL (US)

(72) Inventors: Emad Said Kiriakos, Chicago, IL (US); James Joseph Kunda, Chicago, IL (US)

(73) Assignee: The Boeing Company, Chicago, IL (US)

( * ) Notice: Subject to any disclaimer, the term of this patent is extended or adjusted under 35 U.S.C. 154(b) by 352 days.

(21) Appl. No.: 16/855,390

(22) Filed: Apr. 22, 2020

(65) Prior Publication Data

US 2021/0331812 A1 Oct. 28, 2021

(51) Int. Cl.
*B64D 45/00* (2006.01)
*E05B 47/00* (2006.01)
*B64C 1/14* (2006.01)

(52) U.S. Cl.
CPC ...... *B64D 45/0029* (2019.08); *E05B 47/0002* (2013.01); *B64C 1/1469* (2013.01); *E05B 2047/0068* (2013.01)

(58) Field of Classification Search
CPC ............. B64D 45/0029; E05B 47/0002; E05B 2047/0068; B64C 1/1469
See application file for complete search history.

(56) References Cited

U.S. PATENT DOCUMENTS

| | | | |
|---|---|---|---|
| 3,999,411 A * | 12/1976 | Kambic | E05B 55/00 70/144 |
| 6,733,049 B2 | 5/2004 | Piorkowski | |
| 7,770,949 B2 * | 8/2010 | Kunda | E05B 47/0046 292/341.15 |
| 8,516,864 B2 * | 8/2013 | Greiner | E05B 47/0607 292/201 |
| 9,787,127 B2 * | 10/2017 | Shen | E05B 47/0012 |
| 2008/0169657 A1 * | 7/2008 | Horton | E05B 83/30 200/557 |
| 2020/0224462 A1 * | 7/2020 | Renner | E05B 77/54 |

* cited by examiner

*Primary Examiner* — Mark A Williams
(74) *Attorney, Agent, or Firm* — McDonnell Boehnen Hulbert & Berghoff LLP

(57) ABSTRACT

The present disclosure provides a door latch assembly including (a) a locking pin movable from an extended position where the locking pin is positioned in an aperture of a driver, to a retracted position where the locking pin is configured to be removed from the aperture of the driver, (b) a solenoid including a solenoid plunger having a first end coupled to the locking pin and a second end coupled to a shaft, (c) a lever arm having a first end engaging the shaft, and (d) a switch including an actuator button in contact with the lever arm, wherein when the solenoid is actuated the solenoid plunger moves to retract the locking pin from the aperture and causes the shaft to displace the lever arm and the actuator button to activate the switch.

20 Claims, 8 Drawing Sheets

AIRCRAFT DOOR LATCH ASSEMBLY

FIELD

The present disclosure relates generally to an aircraft door latch assembly, and more particularly, to an electromechanical locking latch with a lock status indicator for use in a flight deck door system of an aircraft.

BACKGROUND

Many aircrafts provide a flight deck door that separates the flight deck, or cockpit, from the cabin of the aircraft. During flight, the flight deck door is typically locked for security reasons. However, during flight operations, a member of the flight crew may need to leave the flight deck temporarily, requiring the flight deck door to be opened. The traditional method of locking and unlocking the flight deck door is by activating a solenoid mounted inside of a hollow door post that runs from floor to ceiling. This solenoid is large as it was sized to provide unlocking during a rapid flight deck decompression event, as well as locking/unlocking in more traditional use cases of the flight deck door. As such, the hollow door post amplified a click made by the solenoid upon activation of the solenoid.

Several existing methods have been employed to reduce the noise of the solenoid when locking and unlocking the flight deck door. For example, dampening tape has been applied to the inside of the door post to reduce the reactivity of the door post, and rubber cushions and dampers have been used to slow down the action of moving parts in the flight deck door. While these solutions produced some reductions in the noise of the solenoid when locking and unlocking the flight deck door, none of these solutions addressed the root cause of the problem. Therefore, an aircraft door latch assembly that enables a flight deck door of an aircraft to be locked and unlocked with minimal sound may be desirable.

SUMMARY

In one aspect, a door latch assembly is described. The door latch assembly includes (a) a locking pin movable from an extended position in which the locking pin is positioned in an aperture of a driver to thereby inhibit rotation of the driver such that the door latch assembly is maintained in a locked state, to a retracted position in which the locking pin is configured to be removed from the aperture of the driver to thereby enable rotation of the driver to transition the door latch assembly from the locked state to an unlocked state, (b) a solenoid including a solenoid plunger having a first end coupled to the locking pin and a second end coupled to a shaft, wherein when the solenoid is not actuated the solenoid plunger is biased by a spring to move the locking pin into the aperture, (c) a lever arm having a first end engaging the shaft, and (d) a switch including an actuator button in contact with the lever arm, wherein when the solenoid is actuated the solenoid plunger moves to retract the locking pin from the aperture and causes the shaft to displace the lever arm and the actuator button to activate the switch.

In another aspect, a flight deck door system for an aircraft is described. The flight deck door system includes (a) a flight deck door, wherein the flight deck door, when in a closed position, separates a flight deck area of the aircraft from a cabin area of the aircraft, (b) a door frame comprising a first post and a second post, wherein the flight deck door is rotatably coupled to the first post via a set of hinges such that the flight deck door is rotatable into the flight deck area in an open position, (c) a latch recess positioned within the second post, wherein the latch recess is arranged to engage a door latch bolt of the flight deck door when the flight deck door is in the closed position, (d) a driver positioned on an aft side of the flight deck door, wherein the driver is configured to retract the door latch bolt in response to a rotation of the driver to thereby transition the flight deck door from a locked state to an unlocked state, and wherein the driver includes an aperture, and (e) a door latch assembly comprising: (i) a locking pin movable from an extended position in which the locking pin is positioned in the aperture of the driver to thereby inhibit rotation of the driver such that the flight deck door is maintained in the locked state, to a retracted position in which the locking pin is configured to be removed from the aperture of the driver to thereby enable rotation of the driver to transition the flight deck door from the locked state to the unlocked state, (ii) a solenoid including a solenoid plunger having a first end coupled to the locking pin and a second end coupled to a shaft, wherein when the solenoid is not actuated the solenoid plunger is biased by a spring to move the locking pin into the aperture, (iii) a lever arm having a first end engaging the shaft, (iv) a switch including an actuator button in contact with the lever arm, wherein when the solenoid is actuated the solenoid plunger moves to retract the locking pin from the aperture and causes the shaft to displace the lever arm and the actuator button to activate the switch.

In yet another aspect, a for establishing a flight deck door of an aircraft, wherein the flight deck door, when in a closed position, separates a flight deck area of the aircraft from a cabin area of the aircraft is described. The method includes (a) positioning a door frame in the cabin area, wherein the door frame comprises a first post and a second post, and wherein the second post comprises a latch recess, (b) coupling the door frame to the aircraft, (c) coupling the flight deck door to the first post via a set of hinges, wherein the flight deck door is rotatable via the set of hinges into the flight deck area to an open position, (d) positioning a driver on an aft side of the flight deck door, wherein the driver is configured to retract a door latch bolt in response to a rotation of the driver to thereby transition the flight deck door from a locked state to an unlocked state, and wherein the driver includes an aperture, and (e) positioning a door latch assembly in the flight deck door, wherein the door latch assembly comprises: (i) a locking pin movable from an extended position in which the locking pin is positioned in the aperture of the driver to thereby inhibit rotation of the driver such that the flight deck door is maintained in the locked state, to a retracted position in which the locking pin is configured to be removed from the aperture of the driver to thereby enable rotation of the driver to transition the flight deck door from the locked state to the unlocked state, (ii) a solenoid including a solenoid plunger having a first end coupled to the locking pin and a second end coupled to a shaft, wherein when the solenoid is not actuated the solenoid plunger is biased by a spring to move the locking pin into the aperture, (iii) a lever arm having a first end engaging the shaft, and (iv) a switch including an actuator button in contact with the lever arm, wherein when the solenoid is actuated the solenoid plunger moves to retract the locking pin from the aperture and causes the shaft to displace the lever arm and the actuator button to activate the switch.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 6:
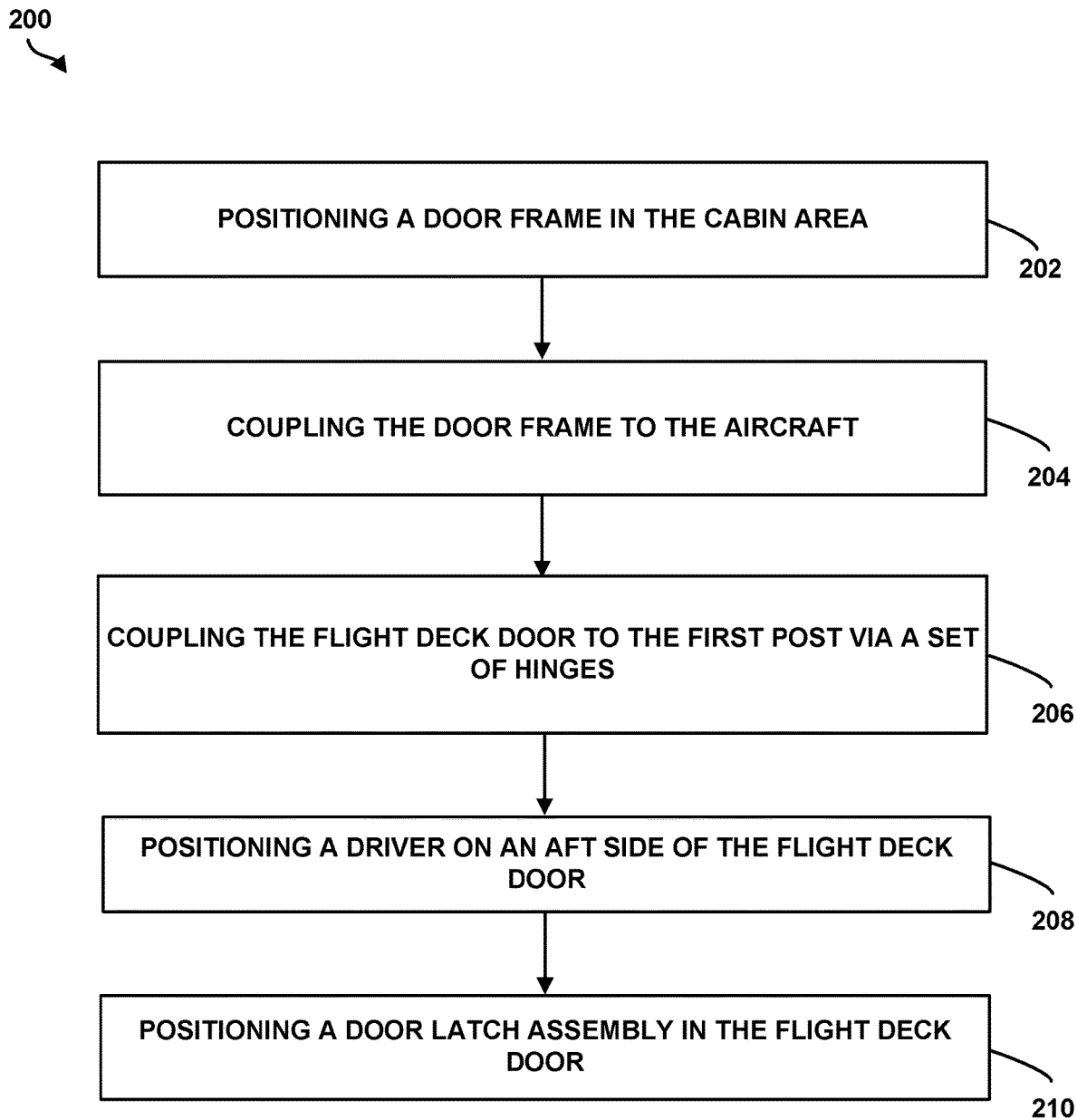
FIG. 6 is a flowchart of an example method, according to an example implementation.

In FIG. 6, the blocks represent operations and/or portions thereof and lines connecting the various blocks do not imply any particular order or dependency of the operations or portions thereof. It will be understood that not all dependencies among the various disclosed operations are necessarily represented. FIG. 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise specifically noted, elements depicted in the drawings are not necessarily drawn to scale.

Illustrative, non-exhaustive examples, which may or may not be claimed, of the subject matter according the present disclosure are provided below.

The present disclosure provides an aircraft door latch assembly that enables a flight deck door of an aircraft to be locked and unlocked with minimal noise. In particular, the door latch assembly described herein moves the flight deck door locking function out of the door post and into a quiet electromechanical latch with a lock status indicator. The door latch is mounted in the flight deck door panel which is acoustically not reactive. The solenoid for the door latch assembly is also smaller and weaker than traditional lock solenoids because the new smaller solenoid is only needed for normal unlock/lock operations. As a result, unlocking/locking of the latch is masked by ambient noise in the airplane. The larger solenoid in the door post is retained. Once the larger solenoid is activated at the beginning of a flight, it is only deactivated during a rapid flight deck decompression event, which is an extremely remote probability.

These and other improvements are described in more detail below. Implementations described below are for purposes of example. The implementations described below, as well as other implementations, may provide other improvements as well.

Figure 1:
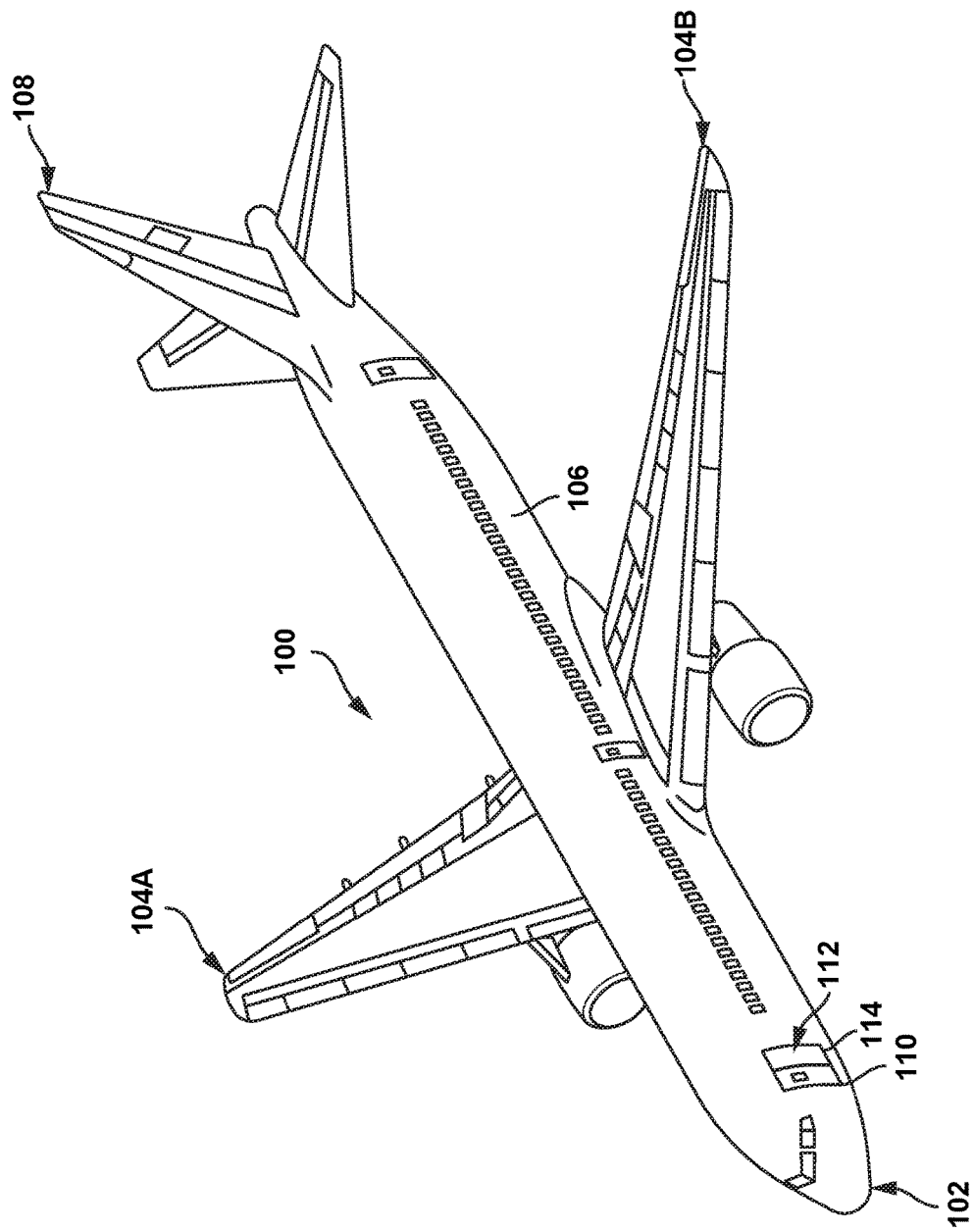
FIG. 1 is a perspective view of an aircraft, according to an example implementation.

With reference to the Figures, FIG. 1 is a perspective view of an aircraft 100, according to an example implementation. The aircraft 100 includes a nose 102, wings 104A-104B, a fuselage 106, and a tail 108, according to an example implementation. The aircraft 100 includes many areas arranged for storage of items during flight. In one example, the fuselage 106 includes storage underneath a passenger compartment for storing luggage and other items or supplies. In another example, the passenger compartment in the fuselage 106 includes overhead bins and under seat areas for storing further items. As further illustrated in FIG. 1, the aircraft 100 includes an aircraft door 110 that provides entry and/or exit to and from the cabin area 112 of the aircraft 100. As shown in FIG. 1, the fuselage 106 includes a fuselage cutout 114, and the aircraft door 110 is configured to translate from a closed position in which the aircraft door 110 covers the fuselage cutout 114 in the fuselage 106 to an open position (shown in FIG. 1).

Figure 2:
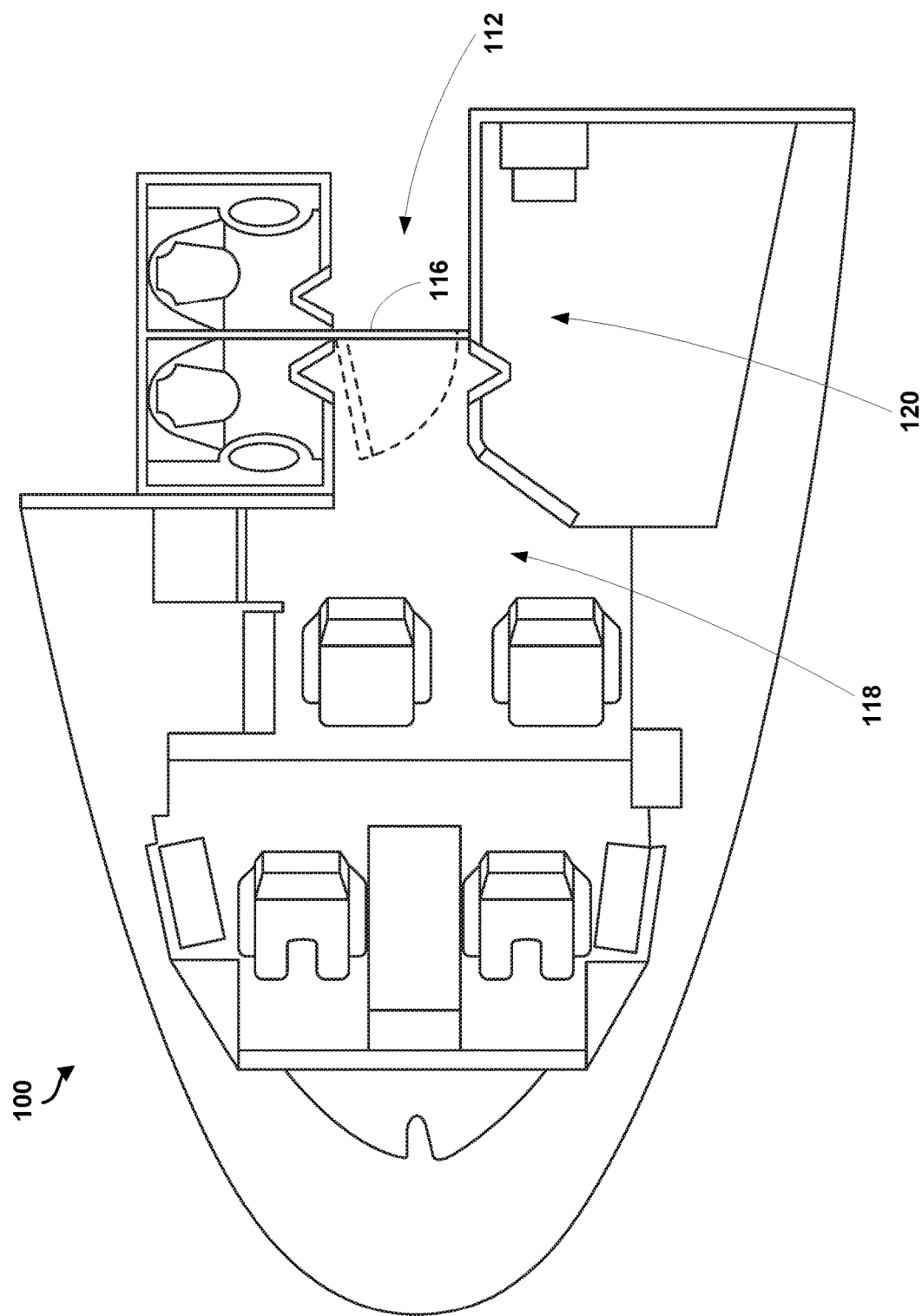
FIG. 2 is a plan view of a portion an aircraft, according to an example implementation.

FIG. 2 illustrates a plan view of a portion of the aircraft 100. As shown in FIG. 2, the aircraft 100 includes a flight deck door 116 that, when in a closed position, separates the flight deck area 118 of the aircraft 100 from the cabin area 112 of the aircraft 100. As shown in FIG. 2, the aircraft 100 may further include a flight deck crew rest area 120 positioned near the flight deck door 116. Due to the close proximity of the flight deck crew rest area 120 to the flight deck door 116, it is desirable for the opening of the flight deck door 116 to cause minimal noise in the flight deck crew rest area 120.

Figure 3A:
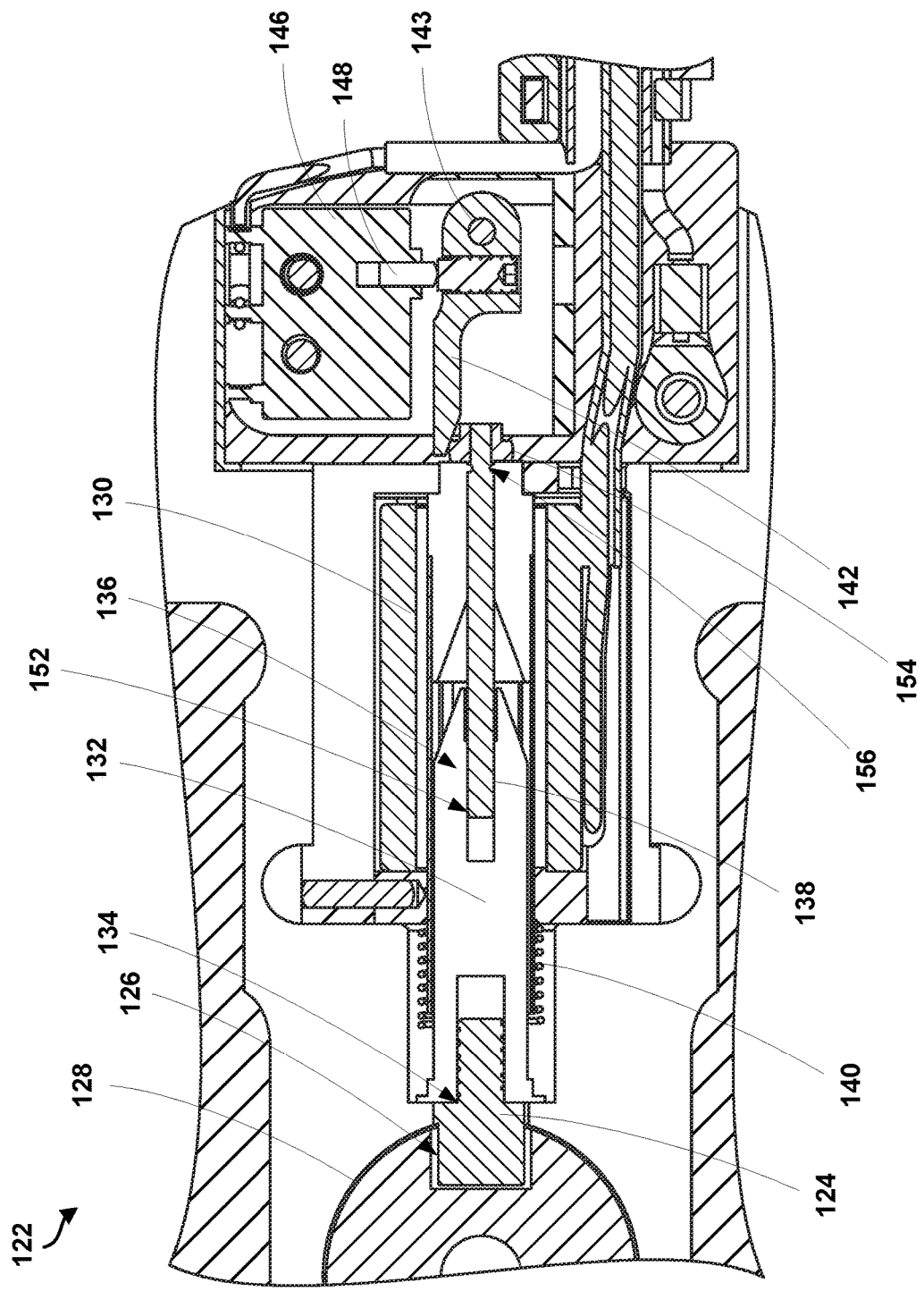
FIG. 3A is a cross-sectional view of a door latch assembly for use with a flight deck door with a locking pin in an extended position, according to an example implementation.
Figure 3B:
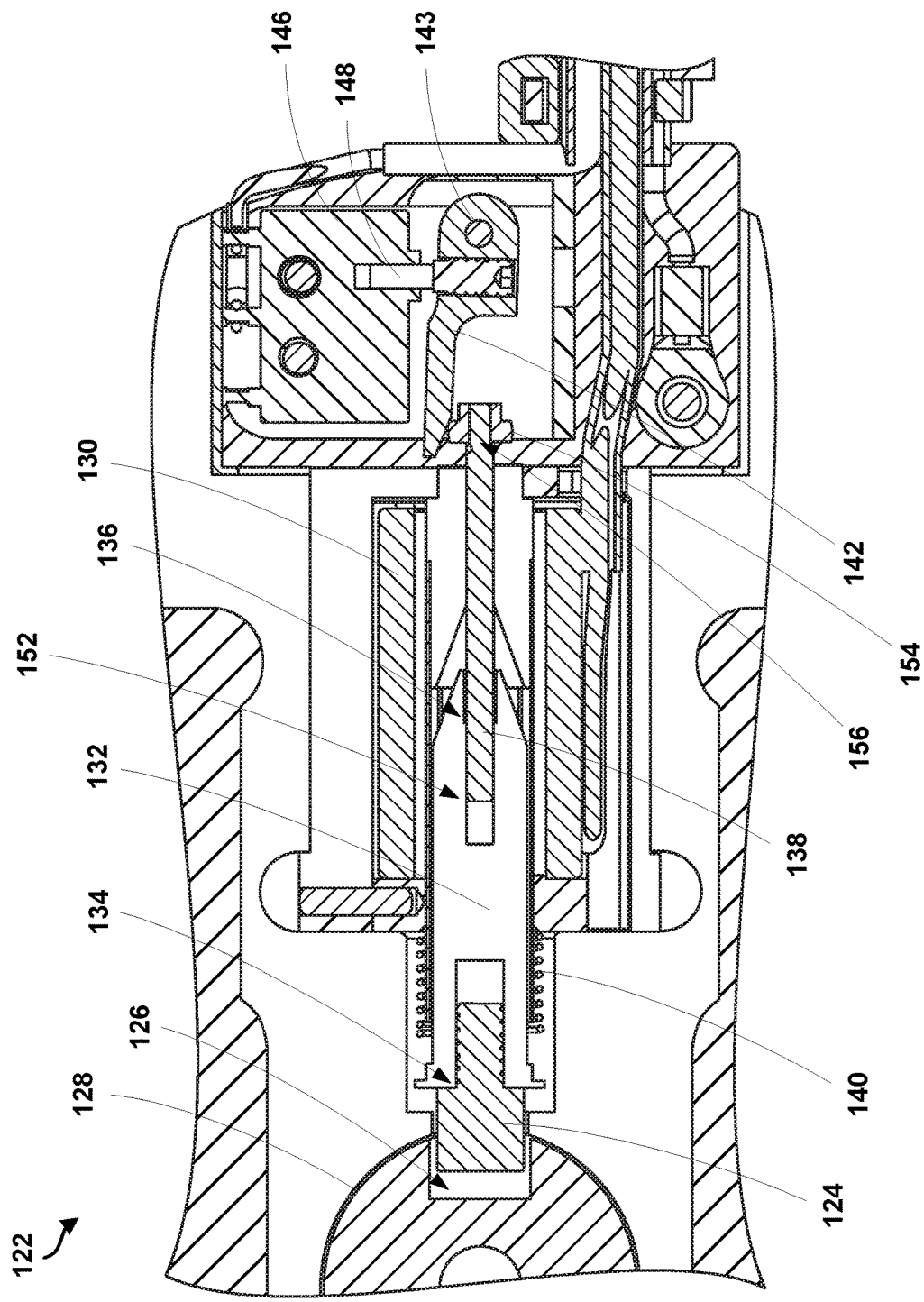
FIG. 3B is a cross-sectional view of the door latch assembly of FIG. 3A with the locking pin in an intermediate position, according to an example implementation.
Figure 3C:
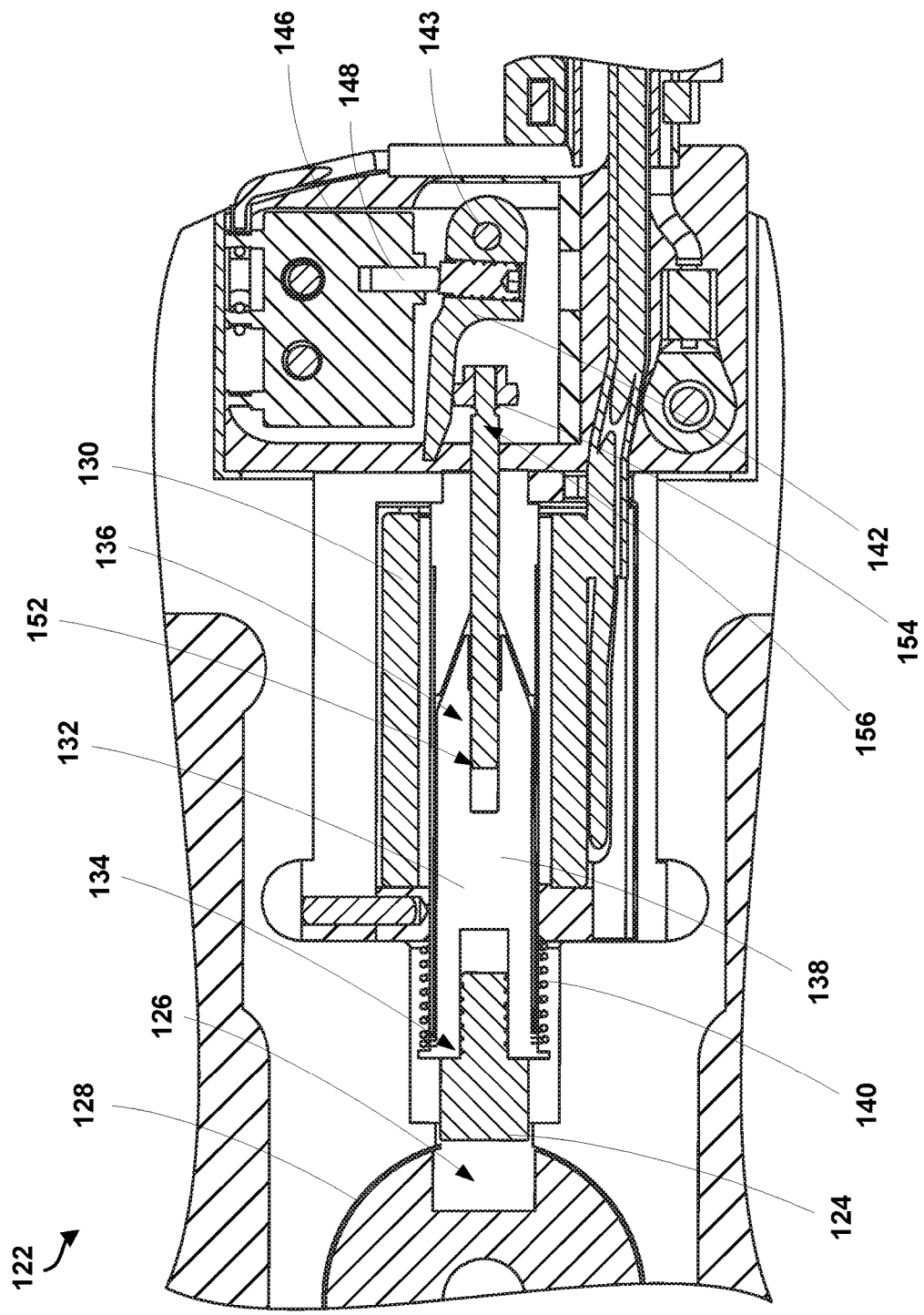
FIG. 3C is a cross-sectional view of the door latch assembly of FIG. 3A with the locking pin in a retracted position, according to an example implementation.

FIGS. 3A-3C illustrates a door latch assembly 122 for use with the flight deck door 116 that provides improved noise reduction when locking and unlocking the flight deck door 116. As shown in FIGS. 3A-3C, the door latch assembly 122 includes a locking pin 124 movable from an extended position (shown in FIG. 3A) in which the locking pin 124 is positioned in an aperture 126 of a driver 128 to thereby inhibit rotation of the driver 128 such that the door latch assembly 122 is maintained in a locked state, to a retracted position (show in FIG. 3C) in which the locking pin 124 is configured to be removed from the aperture 126 of the driver 128 to thereby enable rotation of the driver 128 to transition the door latch assembly 122 from the locked state to an unlocked state. The door latch assembly 122 may transition from the locked state to the unlocked state based on an input from a user (e.g., such as by entering a correct combination into a keypad, or through some other means).

As shown in FIGS. 3A-3C, the door latch assembly 122 also includes a solenoid 130 including a solenoid plunger 132 having a first end 134 coupled to the locking pin 124 and a second end 136 coupled to a shaft 138. When the solenoid 130 is not actuated, the solenoid plunger 132 is biased by a spring 140 to move the locking pin 124 into the aperture 126. The door latch assembly 122 also includes a lever arm 142 having a first end 144 engaging the shaft 138. The door latch assembly 122 also includes a switch 146 including an actuator button 148 in contact with the lever arm 142. When the solenoid 130 is actuated, the solenoid plunger 132 moves to retract the locking pin 124 from the aperture 126 and causes the shaft 138 to displace the lever arm 142 and the actuator button 148 to activate the switch 146.

The actuator button 148 and the lever arm 142 of the door latch assembly 122 illustrated in FIGS. 3A-3C are configured to allow a single switch 146 to provide an indication of both the locked state and the unlocked state of the door latch assembly 122. In particular, the actuator button 148 of the switch 146 is biased to a position that provides an indication that the door latch assembly 122 is in the locked state (as shown in FIG. 3A). The lever arm 142 is configured to have a length such that the lever arm 142 is rotated (lifted) by engagement with the shaft 138 to actuate the switch 146 at approximately the point when the locking pin 124 being moved by the solenoid plunger 132 is in an unlocked position relative to the driver 128. As the lever arm 142 rotates to increase contact on the actuator button 148, the actuator button 148 is depressed to provide an indication that the door latch assembly 122 is in the unlocked state (as shown in FIGS. 3B-3C). When the locking pin 124 is being moved by the solenoid plunger 132 towards the locked position, the reverse movement of the shaft 138 causes an opposite rotation (lowering) of the lever arm 142 to cause the actuator button 148 and switch 146 to switch at the point that the locking pin 124 is positioned into at least 70 percent of the depth of the aperture 126 of the driver 128. Such a configuration provides an advantage over traditional locking systems that include two switches (one switch to indicate the door is locked, a second switch to indicate the door is unlocked), as the single switch of the present disclosure is cheaper, has less components, and is easier to manufacture.

In one example, the door latch assembly 122 also includes an indicator device 150 (shown in FIG. 5) electrically coupled to the switch 146 for indicating a status of the door latch assembly 122. In use, when the solenoid 130 is actuated, the solenoid plunger 132 moves the locking pin 124 from the extended position to the retracted position and displaces the shaft 138 in a direction towards the lever arm 142, such that the shaft 138 engages and imparts rotation of the lever arm 142 via the pin 143 to increase contact on the actuator button 148 and activate the switch 146 to thereby cause the indicator device 150 to provide an indication that the door latch assembly 122 is in the unlocked state. In one such example, the rotation of the lever arm 142 to increase contact on the actuator button 148 of the switch 146 causes the indicator device 150 to provide the indication that the door latch assembly 122 is in the unlocked state prior to the locking pin 124 being fully removed from the aperture 126 of the driver 128.

Further, when the solenoid 130 is not actuated, the spring 140 causes the solenoid plunger 132 to move the locking pin 124 to transition from the retracted position to the extended position and displace the shaft 138 in a direction away from the lever arm 142, such that the shaft 138 causes an opposite rotation of the lever arm 142 to decrease contact on the actuator button 148 of the switch 146 to thereby cause the indicator device 150 to provide an indication that the door latch assembly 122 is in the locked state. In such an example, the rotation of the lever arm 142 to decrease contact on the actuator button 148 of the switch 146 causes a deactivation of the switch 146 and the indicator device 150 to provide the indication that the door latch assembly 122 is in the locked state only when the locking pin 124 is positioned into at least 70 percent of a depth of the aperture 126 of the driver 128. Such an arrangement ensures that a false positive indication that the flight deck door 116 is locked is very unlikely.

In another example, the second end 136 of the solenoid plunger 132 is coupled to a first end 152 of the shaft 138, and a rear stop 154 is coupled to a second end 156 of the shaft 138, such that the lever arm 142 interacts with the second end 156 of the shaft 138 via the rear stop 154. The lever arm 142 includes a length that is in engagement with the shaft 138, and a travel distance of the solenoid plunger 132 is less than the length such that upon deactivation of the solenoid 130 the solenoid plunger 132 moves the locking pin 124 into at least 70 percent of a depth of the aperture 126 before the lever arm 142 causes the actuator button 148 to deactivate the switch 146.

Figure 4A:
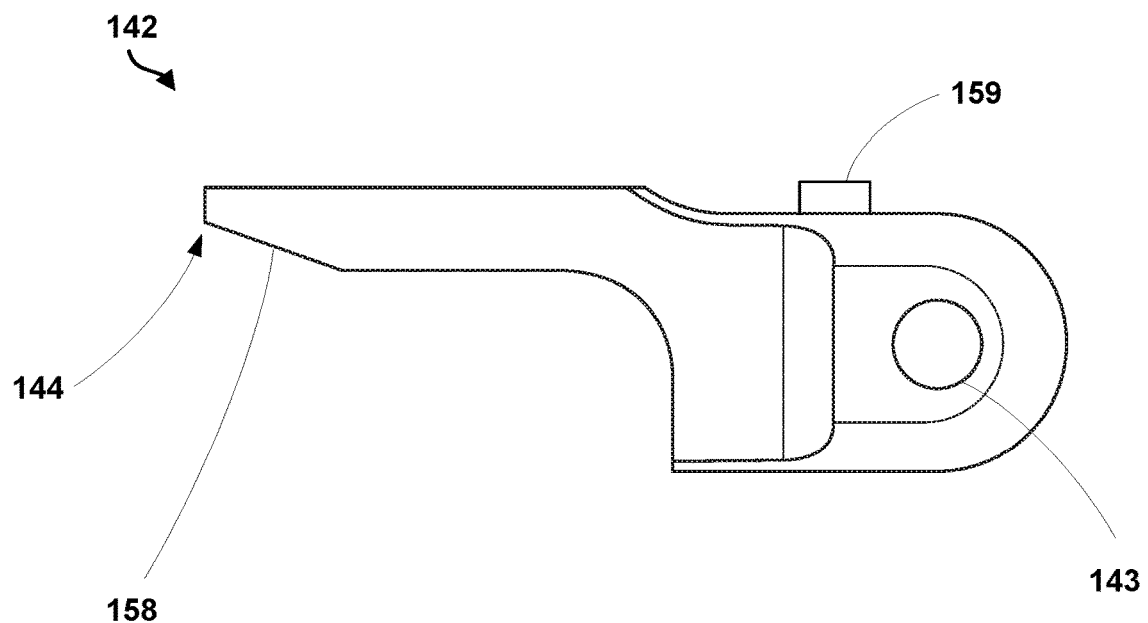
FIG. 4A is a side view of a lever arm of the door latch assembly of FIG. 3A, according to an example implementation.
Figure 4B:
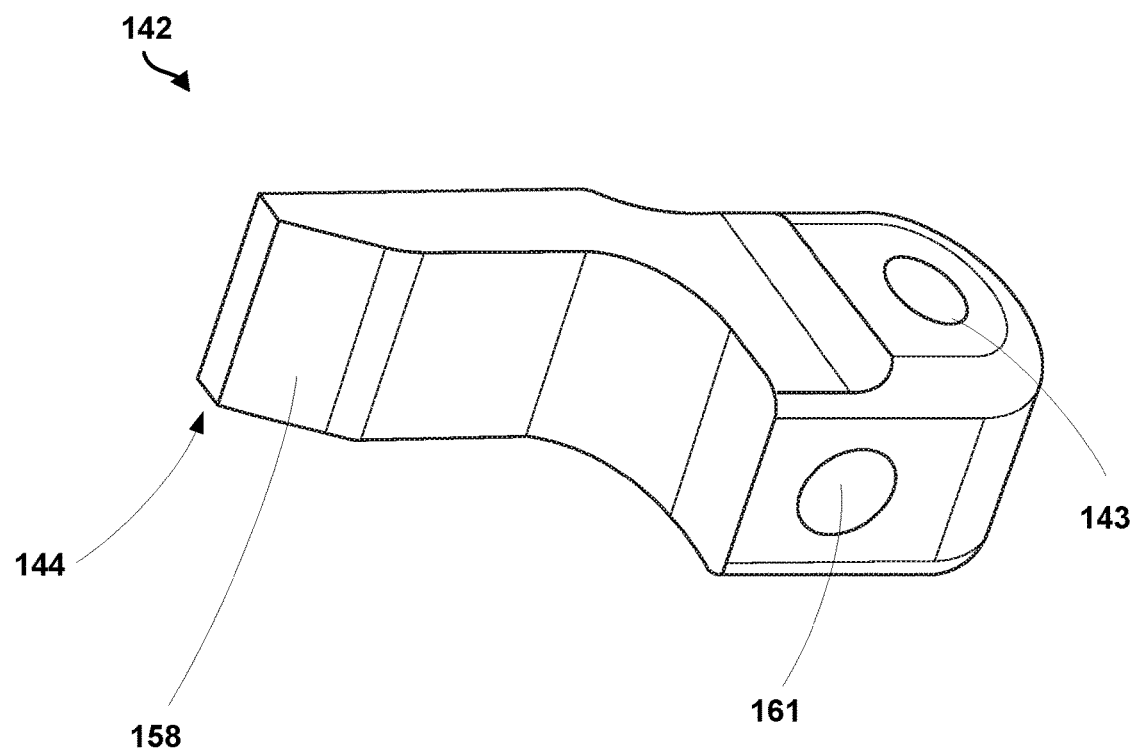
FIG. 4B is a perspective view of the lever arm of FIG. 4A, according to an example implementation.

FIG. 4A illustrates a side view of the lever arm 142 of the door latch assembly 122. As shown in FIG. 4A, the first end 144 of the lever arm 142 includes an angled surface 158 that interacts with the second end 156 of the shaft 138. As further shown in FIG. 4A, the lever arm 142 may include an adjustable contact point 159 for interaction with the actuator button 148 of the switch 146, such that a distance between the adjustable contact point 159 of the lever arm 142 and the actuator button 148 is adjustable. In one example, the adjustable contact point 159 comprises a set screw that accessible by a user via a through-hole 161 in the lever arm 142. The adjustable contact point 159 enables the user to more finely tune when the indication of locked and unlocked occurs. In particular, the adjustable contact point 159 in conjunction with the actuator button 148 and the lever arm 142 are configured to work within the working range of the actuator button 148 of the switch 146 to ensure that the switch 146 will indicate properly on the open position and on the closed position.

In operation, when the solenoid 130 is not actuated, the solenoid plunger 132 is biased by the spring 140 to move the locking pin 124 into the aperture 126, as shown in FIG. 3A. When the solenoid 130 is actuated (e.g., a request to unlock the flight deck door 116 is received by the door latch assembly 122), the solenoid plunger 132 starts to displace the shaft 138 in a direction towards the lever arm 142, as shown in FIG. 3B. In particular, as shown in FIG. 3B, the angled surface 158 of the lever arm 142 contacts the second end 156 of the shaft 138, and the shaft 138 engages and imparts rotation of the lever arm 142 to increase contact on the actuator button 148 and activate the switch 146 to thereby cause the indicator device 150 to provide an indication that the door latch assembly 122 is in the unlocked state. In one example, a movement of the solenoid plunger 132 is perpendicular to a movement of the actuator button 148 as the locking pin 124 transitions from the extended position to the retracted position.

As shown in FIG. 3B, the locking pin 124 in an intermediate position between the extended position and the retracted position when the actuator button 148 activates the switch 146. As such, the indicator device 150 provides the indication that the door latch assembly 122 is in the unlocked state prior to the locking pin 124 being fully removed from the aperture 126 of the driver 128. As the solenoid plunger 132 continues to displace the shaft 138 further in a direction towards the lever arm, the shaft 138 continues to engage the lever arm 142 until the locking pin 124 is fully removed from the aperture 126 of the driver 128, as shown in FIG. 3C.

Figure 5:
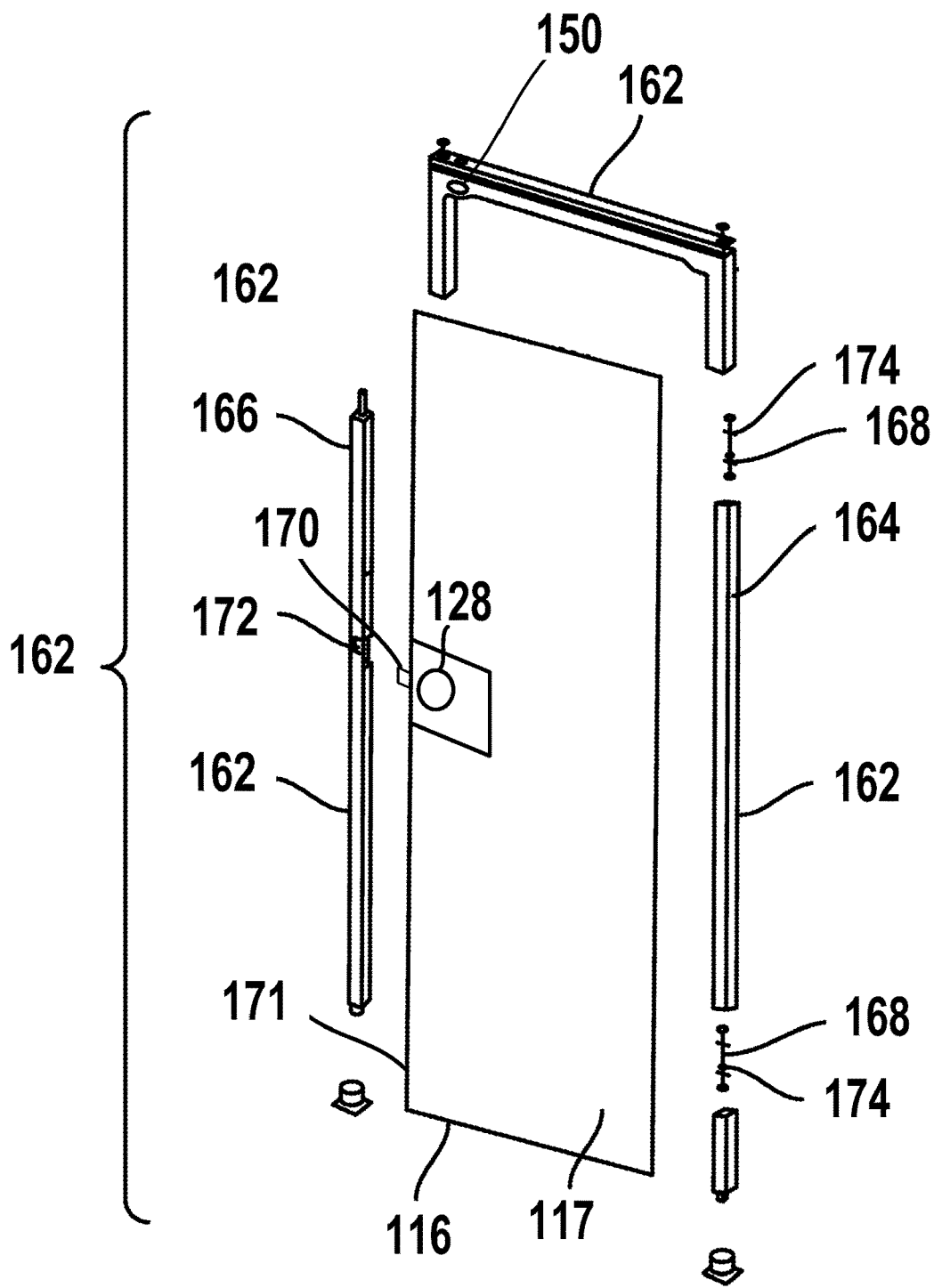
FIG. 5 is an exploded view of a flight deck door system for an aircraft, according to an example implementation.

FIG. 5 is an exploded view of a flight deck door system 160 of the aircraft 100, according to an example implementation. The flight deck door system 160 includes the flight deck door 116. As discussed above in relation to FIG. 2, the flight deck door 116, when in a closed position, separates a flight deck area 118 of the aircraft 100 from a cabin area 112 of the aircraft 100. The flight deck door system 160 further includes a door frame 162 that includes a first post 164 and a second post 166. The flight deck door 116 may be rotatably coupled to the first post 164 via a set of hinges 168, such that the flight deck door 116 is rotatable into the flight deck area 118 or cabin area 112 in an open position. The flight deck door 116 further includes a door latch bolt 170 positioned on an edge 171 of the flight deck door 116, as shown in FIG. 5.

As further shown in FIG. 16, a latch recess 172 may be positioned within the second post 166 of the door frame 162. The latch recess 172 is arranged to engage the door latch bolt 170 of the flight deck door 116 when the flight deck door 116 is in the closed position. Further, the door latch bolt 170 may be configured to disengage from the latch recess 172 to transition the flight deck door 116 to the open position. The flight deck door system 160 further includes a driver 128 positioned on an aft side 117 of the flight deck door 116. The driver 128 is configured to retract the door latch bolt 170 in response to a rotation of the driver 128 to thereby transition the flight deck door 116 from a locked state to an unlocked state. As discussed above in relation to FIGS. 3A-4B, the driver 128 includes an aperture 126. The flight deck door system 160 further includes the door latch assembly 122 of any of the embodiments described above in relation to FIGS. 3A-4B.

FIG. 5 further illustrates an indicator device 150 positioned at the top of the door frame 162 facing aft. The indicator device 150 may be positioned in alternative locations, such as near the driver 128 of the door latch assembly 122 as a non-limiting example. Although it is not shown in FIG. 5, a second indicator device may be positioned on the opposite side of the door frame 162 facing forward. The aft facing indicator device 150 is positioned to be visible from the cabin area 112, while the forward facing indicator device is positioned to be visible from the flight deck. The indicator device 150 may comprise a visual indication (e.g., a light and/or a textual indication). Additionally or alternatively, the indicator device 150 may comprise an audible indication. The indicator device 150 helps the flight crew to determine the status of the door latch bolt 170, to ensure that the flight deck door 116 is locked before performing a further action. For example, the indicator device 150 is turned on when the flight deck door 116 is latched, and the indicator device 150 is turned off when the flight deck door 116 is unlatched.

In some implementations, as discussed above, the flight deck door 116 may generally remain closed during operation of the aircraft. Accordingly, in some embodiments the set of hinges 168 may include a hinge spring 174 positioned to bias the flight deck door 116 from the open position to the closed position when the door latch bolt 170 and the latch recess 172 are disengaged. As shown in FIG. 5, the set of hinges 168 may include a hinge spring 174 in each of the multiple individual hinges, or there may alternatively be a single hinge spring 174. Further, the flight deck door 116 or the door frame 107 may include other springs or similar components to bias the flight deck door 116 to the closed position when the door latch bolt 170 and the latch recess 172 are disengaged.

In operation, an authorized individual may need to access the flight deck area 118 during flight. The authorized individual may enter a code into a keypad, or otherwise provide an indication that they have the authority to open the flight deck door 116. Once that input is provided to the door latch assembly 122, the solenoid 130 is actuated, and the solenoid plunger 132 starts to displace the shaft 138 in a direction towards the lever arm 142. The angled surface 158 of the lever arm 142 contacts the second end 156 of the shaft 138, and the shaft 138 engages and imparts rotation of the lever arm 142 to increase contact on the actuator button 148 and activate the switch 146 to thereby cause the indicator device 150 to provide an indication that the door latch assembly 122 is in the unlocked state. The movement of the solenoid plunger 132 removes the locking pin 124 from the aperture 126 of the driver 128, freeing the driver 128 to rotate and remove the door latch bolt 170 from the latch recess 172, and thereby enabling the flight deck door 116 to be opened.

FIG. 6 is a block diagram of an example of a method for establishing a flight deck door 116 of an aircraft 100, wherein the flight deck door 116, when in a closed position, separates a flight deck area 118 of the aircraft 100 from a cabin area 112 of the aircraft 100. Method 200 shown in FIG. 6 presents an embodiment of a method that could be used with any of the embodiments of the aircraft 100, the door latch assembly 122, and the flight deck door system 160 discussed above in relation to FIGS. 1-5, as examples. Method 200 includes one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes positioning a door frame 162 in the cabin area 112. The door frame 162 comprises a first post 164 and a second post 166, and the second post 166 comprises a latch recess 172. At block 204, the method 200 includes coupling the door frame 162 to the aircraft 100. At block 206, the method 200 includes coupling the flight deck door 116 to the first post 164 via a set of hinges 168. The flight deck door 116 is rotatable via the set of hinges 168 into the flight deck area 118 to an open position. At block 208, the method 200 includes positioning a driver 128 on an aft side 117 of the flight deck door 116. The driver 128 is configured to retract a door latch bolt 170 in response to a rotation of the driver 128 to thereby transition the flight deck door 116 from a locked state to an unlocked state. As discussed above, the driver 128 includes an aperture 126. At block 210, the method 200 includes positioning a door latch assembly 122 in the flight deck door 116. The door latch assembly 122 may include any of the features of the door latch assembly 122 described above in relation to FIGS. 3A-4B.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A door latch assembly comprising:
a locking pin movable from an extended position in which the locking pin is positioned in an aperture of a driver to thereby inhibit rotation of the driver such that the door latch assembly is maintained in a locked state, to a retracted position in which the locking pin is configured to be removed from the aperture of the driver to thereby enable rotation of the driver to transition the door latch assembly from the locked state to an unlocked state;
a solenoid including a solenoid plunger having a first end coupled to the locking pin and a second end coupled to a shaft, wherein when the solenoid is not actuated the solenoid plunger is biased by a spring to move the locking pin into the aperture;
a lever arm having a first end engaging the shaft; and
a switch including an actuator button in contact with the lever arm,
wherein when the solenoid is actuated the solenoid plunger moves to retract the locking pin from the aperture and causes the shaft to displace the lever arm and the actuator button to activate the switch,
wherein the lever arm includes an adjustable contact point for interaction with the actuator button of the switch, such that a distance between the adjustable contact point of the lever arm and the actuator button is adjustable.

2. The door latch assembly of claim 1, further comprising:
an indicator device electrically coupled to the switch for indicating a status of the door latch assembly, wherein, when the solenoid is actuated, the solenoid plunger moves the locking pin from the extended position to the retracted position and displaces the shaft in a direction towards the lever arm, such that the shaft engages and imparts rotation of the lever arm to increase contact on the actuator button and activate the switch to thereby cause the indicator device to provide an indication that the door latch assembly is in the unlocked state.

3. The door latch assembly of claim 2, wherein the rotation of the lever arm to increase contact on the actuator button of the switch causes the indicator device to provide the indication that the door latch assembly is in the unlocked state prior to the locking pin being fully removed from the aperture of the driver.

4. The door latch assembly of claim 2, wherein, when the solenoid is not actuated, the spring causes the solenoid plunger to move the locking pin to transition from the retracted position to the extended position and displace the shaft in a direction away from the lever arm, such that the shaft causes an opposite rotation of the lever arm to decrease contact on the actuator button of the switch to thereby cause the indicator device to provide an indication that the door latch assembly is in the locked state.

5. The door latch assembly of claim 4, wherein the rotation of the lever arm to decrease contact on the actuator button of the switch causes a deactivation of the switch and the indicator device to provide the indication that the door latch assembly is in the locked state when the locking pin is positioned into at least 70 percent of a depth of the aperture of the driver.

6. The door latch assembly of claim 1, wherein the second end of the solenoid plunger is coupled to a first end of the shaft, and wherein a rear stop is coupled to a second end of the shaft, such that the lever arm interacts with the second end of the shaft via the rear stop.

7. The door latch assembly of claim 1, wherein the lever arm includes a length that is in engagement with the shaft, wherein a plunger travel distance is less than the length such that upon deactivation of the solenoid the solenoid plunger moves the locking pin into at least 70 percent of a depth of the aperture before the lever arm causes the actuator button to deactivate the switch.

8. The door latch assembly of claim 1, wherein the first end of the lever arm includes an angled surface that interacts with a second end of the shaft.

9. The door latch assembly of claim 1, wherein a movement of the solenoid plunger is perpendicular to a movement of the actuator button as the locking pin transitions from the extended position to the retracted position.

10. A flight deck door system for an aircraft, the flight deck door system comprising:
a flight deck door, wherein the flight deck door, when in a closed position, separates a flight deck area of the aircraft from a cabin area of the aircraft;
a door frame comprising a first post and a second post, wherein the flight deck door is rotatably coupled to the first post via a set of hinges such that the flight deck door is rotatable into the flight deck area in an open position;
a latch recess positioned within the second post, wherein the latch recess is arranged to engage a door latch bolt of the flight deck door when the flight deck door is in the closed position;
a driver positioned on an aft side of the flight deck door, wherein the driver is configured to retract the door latch bolt in response to a rotation of the driver to thereby transition the flight deck door from a locked state to an unlocked state, and wherein the driver includes an aperture; and
a door latch assembly comprising:
a locking pin movable from an extended position in which the locking pin is positioned in the aperture of the driver to thereby inhibit rotation of the driver such that the flight deck door is maintained in the locked state, to a retracted position in which the locking pin is configured to be removed from the aperture of the driver to thereby enable rotation of the driver to transition the flight deck door from the locked state to the unlocked state;
a solenoid including a solenoid plunger having a first end coupled to the locking pin and a second end coupled to a shaft, wherein when the solenoid is not actuated the solenoid plunger is biased by a spring to move the locking pin into the aperture;
a lever arm having a first end engaging the shaft; and
a switch including an actuator button in contact with the lever arm,
wherein when the solenoid is actuated the solenoid plunger moves to retract the locking pin from the aperture and causes the shaft to displace the lever arm and the actuator button to activate the switch.

11. The flight deck door system of claim 10, wherein the first end of the lever arm includes an angled surface that interacts with a second end of the shaft.

12. The flight deck door system of claim 10, wherein the lever arm includes an adjustable contact point for interaction with the actuator button of the switch, such that a distance between the adjustable contact point of the lever arm and the actuator button is adjustable.

13. The flight deck door system of claim 10, wherein the door latch assembly further comprises:
an indicator device electrically coupled to the switch for indicating a status of the door latch assembly, wherein, when the solenoid is actuated, the solenoid plunger moves the locking pin from the extended position to the retracted position and displaces the shaft in a direction towards the second end of the lever arm, such that the shaft engages and imparts rotation of the lever arm to increase contact on the actuator button and activate the switch to thereby cause the indicator device to provide an indication that the door latch assembly is in the unlocked state.

14. The flight deck door system of claim 13, wherein the rotation of the lever arm to increase contact on the actuator button of the switch causes the indicator device to provide the indication that the door latch assembly is in the unlocked state prior to the locking pin being fully removed from the aperture of the driver.

15. The flight deck door system of claim 13, wherein, when the solenoid is not actuated, the spring causes the solenoid plunger to move the locking pin to transition from the retracted position to the extended position and displace the shaft in a direction away from the lever arm, such that the shaft causes an opposite rotation of the lever arm to decrease contact on the actuator button of the switch to thereby cause the indicator device to provide an indication that the door latch assembly is in the locked state.

16. The flight deck door system of claim 15, wherein the rotation of the lever arm to decrease contact on the actuator button of the switch causes deactivation of the switch and the indicator device to provide the indication that the door latch assembly is in the locked state when the locking pin is positioned into at least 70 percent of a depth of the aperture of the driver.

17. A method for establishing a flight deck door of an aircraft, wherein the flight deck door, when in a closed position, separates a flight deck area of the aircraft from a cabin area of the aircraft, the method comprising:
positioning a door frame in the cabin area, wherein the door frame comprises a first post and a second post, and wherein the second post comprises a latch recess;
coupling the door frame to the aircraft; and
coupling the flight deck door to the first post via a set of hinges, wherein the flight deck door is rotatable via the set of hinges into the flight deck area to an open position;
positioning a driver on an aft side of the flight deck door, wherein the driver is configured to retract a door latch bolt in response to a rotation of the driver to thereby transition the flight deck door from a locked state to an unlocked state, and wherein the driver includes an aperture; and
positioning a door latch assembly in the flight deck door, wherein the door latch assembly comprises:
a locking pin movable from an extended position in which the locking pin is positioned in the aperture of the driver to thereby inhibit rotation of the driver such that the flight deck door is maintained in the locked state, to a retracted position in which the locking pin is configured to be removed from the aperture of the driver to thereby enable rotation of the driver to transition the flight deck door from the locked state to the unlocked state;
a solenoid including a solenoid plunger having a first end coupled to the locking pin and a second end coupled to a shaft, wherein when the solenoid is not actuated the solenoid plunger is biased by a spring to move the locking pin into the aperture;
a lever arm having a first end engaging the shaft; and
a switch including an actuator button in contact with the lever arm,
wherein when the solenoid is actuated the solenoid plunger moves to retract the locking pin from the aperture and causes the shaft to displace the lever arm and the actuator button to activate the switch.

18. The method of claim 17, wherein the door latch assembly further comprises:
an indicator device electrically coupled to the switch for indicating a status of the door latch assembly, wherein, when the solenoid is actuated, the solenoid plunger moves the locking pin from the extended position to the retracted position and displaces the shaft in a direction towards the lever arm, such that the shaft engages and imparts rotation of the lever arm to increase contact on the actuator button and activate the switch to thereby cause the indicator device to provide an indication that the door latch assembly is in the unlocked state.

19. The method of claim 18, wherein, when the solenoid is not actuated, the spring causes the solenoid plunger to move the locking pin to transition from the retracted position to the extended position and displaces the shaft in a direction away from the lever arm, such that the shaft causes an opposite rotation of the lever arm to decrease contact on the actuator button of the switch to thereby cause the indicator device to provide an indication that the door latch assembly is in the locked state.

20. The flight deck door system of claim 10, wherein the lever arm includes a length that is in engagement with the shaft, wherein a plunger travel distance is less than the length such that upon deactivation of the solenoid the solenoid plunger moves the locking pin into at least 70 percent of a depth of the aperture before the lever arm causes the actuator button to deactivate the switch.

\* \* \* \* \*